(No Model.)
M. C. JOHNSON.
VEHICLE WHEEL.
No. 273,850. Patented Mar. 13, 1883.
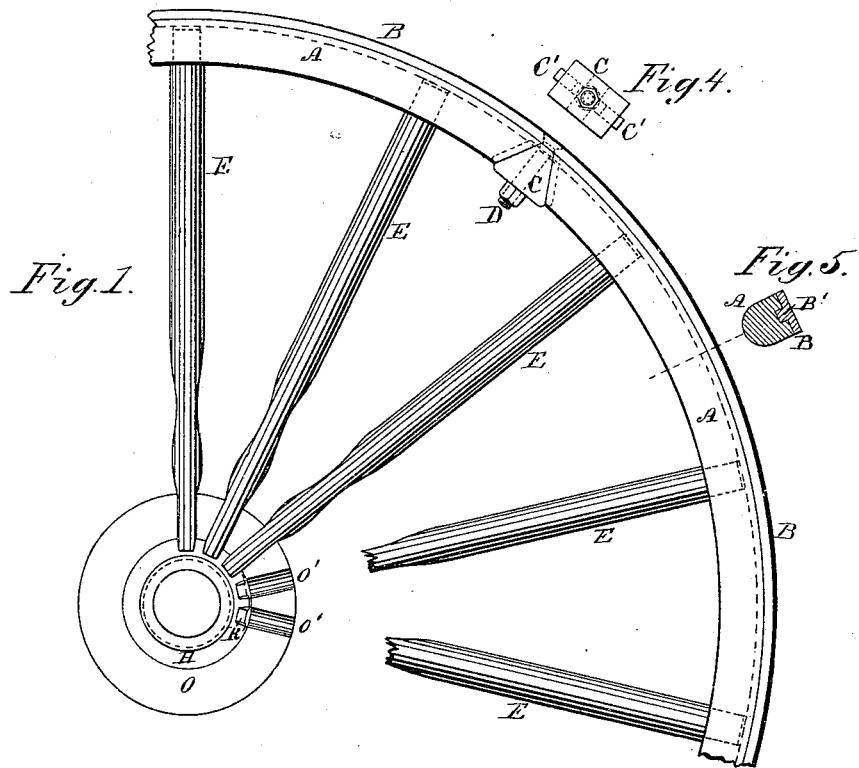
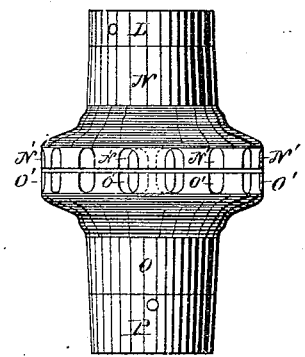
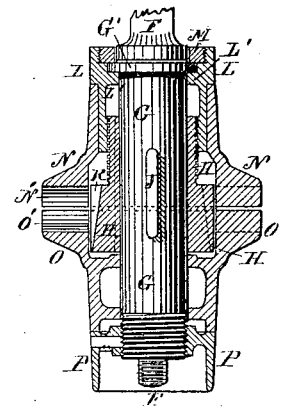

UNITED STATES PATENT OFFICE.

MOSES C. JOHNSON, OF HARTFORD, CONNECTICUT, ASSIGNOR TO HIMSELF AND WILLIAM N. WOODRUFF, OF SAME PLACE.

VEHICLE-WHEEL.

SPECIFICATION forming part of Letters Patent No. 273,850, dated March 13, 1883.

Application filed August 17, 1882. (No model.)

*To all whom it may concern:*

Be it known that I, MOSES C. JOHNSON, of Hartford, in the county of Hartford and State of Connecticut, have invented certain new and useful Improvements in Wheels; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to carriage and other wheels to be used upon wheeled vehicles; and the object of my invention is to provide a wheel which can be tightened when the spokes become loose without resetting the tire, and also to provide a better method of fastening the tire upon the fellies, so that it cannot be laterally displaced.

In the accompanying drawings, illustrating my invention, Figure 1 shows a part of my improved wheel having part of the hub removed, so as to show the interior construction, and also two of the spokes broken away, so as to show the sockets in the hub in which they rest. Fig. 2 is an exterior view of the hub with the spokes removed. Fig. 3 is a section through the middle of the hub with the spokes removed. Fig. 4 is an inside view of the wedge for tightening the fellies of the wheel. Fig. 5 is a cross-section through the felly and tire.

A is the rim of the wheel, which may be made of one or more pieces or fellies in the customary manner. The spokes are inserted into this rim in the usual manner.

B is the tire. This is rolled with a flange, B′, upon its interior side, which fits into a corresponding groove in the felly. This holds the tire firmly from moving sidewise when the felly is pressed up against it, as will be described.

C is a wedge-shaped block, furnished with the tenons C′, which enters between the inclined ends of the fellies to press them apart. The tenons C′ enter into corresponding grooves in the ends of the fellies.

D is a bolt which passes through the block C and the tire B, and is provided with a nut upon the inner end, by which it is drawn inward, so as to press the block outward, and thus separate the ends of the fellies.

E E are the spokes. They are made in the customary manner, except that the inner ends are uniform in section where they pass into the hub, and are inclined at their ends.

F is the axle. It has a spindle passing through the wheel-box G in the usual manner. Upon this spindle the box G and the other parts of the hub attached to it turn.

H is a hollow sleeve, movable longitudinally upon the box G, but prevented from rotating by the key J, which fits in a groove in the inner surface of the sleeve H. The forward end of H is enlarged into a disk, in which inclined slots K are formed to act as wedges against the inner ends of the spokes E. The rear end of the sleeve H is of smaller diameter, and is provided with an exterior screw-thread, as shown in the drawings.

L is a rotating sleeve turning upon the box G, and held from moving longitudinally by the flange G′ upon the box G. A flange, L′, upon L keeps the sleeve from moving inward, and a collar, M, screwed into its rear end, holds it from moving outward. This sleeve is provided with a screw-thread upon its inner surface, which engages with the thread upon H, so that when the sleeve L is turned it moves the part H longitudinally upon the box G. L is provided with capstan-holes or any other common device for turning it with a wrench or spanner.

N is one of the circular plates or disks for holding the spokes. It fits over the sleeve L, as shown in the drawings, and is provided with a series of half-sockets, N′, to inclose the spokes.

O is the other circular plate or disk for holding the spokes. It slides on the outer end of the box G, and is furnished with a series of half-sockets, O′, to inclose the spokes.

P is a nut turning upon a thread on the outer end of the box G, and pressing against the disk O, so as to hold the ends of the spokes firmly between the disks N and O, as they rest in the recesses N′ O′. When the spokes are placed in the recesses in the plates N and O, and the two are screwed together to embrace the spokes, it is intended that the plates shall not come quite together, but that a small space shall be left between them to allow for any shrinking of the wood, so that the plates can be tightened when desired. As a wheel is used, and the parts become dry and worn, the spokes commonly become loose, and the ordinary way of tightening them is to make the tire smaller, thus contracting the whole wheel. This but imperfectly answers the purpose, as the spokes still remain loose in the hub. In my improved wheel the whole is tightened without cutting or shortening the tire, and thereby admitting of my improved form of tire being used, as the flange would be difficult to form in rewelding.

The operation of my improvement is as follows: When it is desired to tighten the wheel the sleeve L is turned, so as to force the spokes outward by drawing the inclined channels in the sleeve H inward. This presses the spokes all outward against the fellies. The inner ends of the spokes are then firmly gripped and held by turning the nut P, which presses the plates N and O together. The fellies are then made of the proper length and tightness by turning the nuts of the bolts D, which drives in the wedge-blocks C, which completes the tightening and renders the whole wheel as firm as when first made.

I am aware that it is not broadly new to tighten spokes in the tire of a wheel by drawing an inclined or conical sleeve against their inner ends to force them outward; also, that it is not broadly new to use a nut for this purpose, and also for the purpose of clamping together two disks, which, when thus clamped, make up a complete set of spoke-sockets. I do not broadly claim the above; but What I do claim, and desire to secure by Letters Patents, is—

1. A sliding screw-threaded sleeve provided with an inclined portion which has longitudinal flanges that are adapted to receive between them the inner ends of the spokes, in combination with a nut adapted to engage with said sleeve and draw it endwise, so as to force said spokes outward, thereby tightening them against the tire, substantially as set forth.

2. A fixed disk and a movable disk, which together make up a set of spoke-sockets, in combination with an axle-box, a screw-threaded sleeve splined on said axle-box, a nut independent of said movable disk, which operates to force said movable disk toward said fixed disk, and a nut which operates to draw said sleeve endwise, in order that the inclined part of said sleeve may force the spokes outward, thereby tightening them against the tire, substantially as set forth.

MOSES C. JOHNSON.

Witnesses:
THEO. G. ELLIS,
W. N. WOODRUFF.